United States Patent Office 3,118,251
Patented Jan. 21, 1964

3,118,251
SOIL-CONDITIONING WITH LINSEED HULLS
Paul G. Moe, Lafayette, Ind., assignor to National Lead Company, New York, N.Y., a corporation of New Jersey
No Drawing. Filed Aug. 4, 1960, Ser. No. 47,374
1 Claim. (Cl. 47—58)

This invention relates to a method for improving the agricultural properties of soil. In particular, this invention relates to a method for converting densely-packed, colloidally-dispersable soils to loose, porous, coherent aggregates.

It is well-known that many soils of potentially great agricultural value, richly endowed with plant nutrients, are rendered undesirable by their physical characteristics. In particular, many of such soils are finely-divided and tend to form hard impervious crusts during dry weather, and to form colloidal dispersions or fine suspensions in water, so that they are carried off by erosion during rainy weather.

Many methods have been proposed for the treatment of such soils to overcome these disadvantages. In the absence of any other treatment, it is possible to overcome the above disadvantages to some extent by erosion control practices. Such methods alone, however, are at best means of alleviating the effects of an undesirable situation, instead of preventing it in the first place. It has also been proposed to add inert materials such as sand, cinder and the like to the soil to help provide passages for air and water, and for root growth, and to minimize surface erosion by allowing movement of water into soil. These measures, however, are costly and are not a complete answer to the problem.

More recently, it has been proposed to add to the soil other materials, particularly soil-conditioner chemicals, the effect of which is to cause the particles to clump together in large porous aggregates which are stable under both moist and dry conditions. Some of these materials have been quite successful. They are, however, too costly to be useful in many applications.

An object of this invention therefore, is to provide a novel method for improving the agricultural properties of soil. Another object is to provide a method for improving the agricultural properties of soil, which does not necessitate the dilution thereof with substantial quantities of inert materials. Still another object is to provide such a method, which is simple and economical, and therefore suitable for large-scale use. Other objects and advantages will become apparent from the following more complete description and claim.

Broadly, this invention contemplates a method of improving the agricultural properties of soil, which consists in admixing therewith flaxseed hulls.

The extraction of linseed oil from flaxseed is an old and well-known operation. Various methods are known to the art, including simple pressing as well as more modern methods involving extraction with hydrocarbon solvents and the like, usually followed by pressing to remove residual solvent and oil.

The residue, consisting of "linseed meal," i.e. the hulls and the pulp, is then further treated to separate the latter two fractions. Again, there are various well-known methods of effecting this separation. One of the most convenient and economical, and therefore the method preferred by us, is by extraction with NaOH or $Na_2S$ of the meal remaining after the extraction of the linseed oil. If it is desired to recover the protein from the NaOH or $Na_2S$ extract, this may be accomplished by reprecipitation with a suitable agent such as sulfur dioxide. It is however, with the final residue—that is, the hull fraction—that the present invention is concerned.

It has previously been suggested to use whole linseed meal as a fertilizer material. Although both the hull and the pulp fractions contain nitrogen and are therefore useful as fertilizer materials, we have discovered that the hull fraction is particularly effective as a soil-conditioning agent. Linseed pulp, on the other hand, is susceptible of other uses. For example, linseed meal has been used as a cattle feed. The hull fraction, for this purpose, is of relatively little value, being rather indigestible and contributing little except roughage to the animal diet. The major portion of the nutrients is to be found in the pulp fraction. It is therefore advantageous to separate the pulp fraction from the hull fraction and use the former as a feed material and the latter as a soil-conditioning agent.

Similarly, it has been found that the linseed protein, which is found principally in the pulp fraction, is a source of material for synthetic fibers for textiles and the like. Such fibers and methods of making them are more fully described and claimed in applications Serial No. 648,002, filed March 25, 1957, now U.S. Patent 2,992,882, and Serial No. 719,487, filed March 6, 1958, now U.S. Patent 2,992,933, of W. M. Besso, A. F. Diorio, and W. L. Hochner, both of which applications are assigned to the assignee hereof. For this purpose too, the hulls are of relatively little value, the principal source of protein being in the pulp fraction. Again, therefore, it is advantageous to separate the two fractions and use the pulp as a source of protein and the hulls as a soil-conditioning agent.

The amount of the hull material employed will vary somewhat, depending on the characteristics of the soil being treated. In general, however, amounts as low as 500 pounds of residue per acre of soil are sufficient to give an appreciable beneficial effect.

Amounts greater than 4000 pounds per acre of soil are generally not desirable as no additional enhancement of the soil properties is ordinarily obtained thereby. Higher amounts, up to 10,000 pounds per acre or higher, may be used in special applications where high nitrogen applications are not disadvantageous. These amounts contemplate a distribution of the conditioner to normal tillage depth, i.e. about 7 inches. Correspondingly larger or smaller amounts would be used where the soil is tilled or treated to a greater or lesser depth than normal. In any event, the upper limit of permissible application depends on the nitrogen tolerance of the crop. In this respect, linseed hulls enjoy an advantage over whole meal, in that the nitrogen content is lower than that of the meal permitting the use of higher spreading rates in the case of the hulls. Even at equal spreading rates the hulls are more effective in soil-conditioning than the meal, but at equivalent nitrogen content rates of application, the effect is even greater.

The means used for incorporation of the residue into the soil composition are not critical, but it is important that the conditioner be worked in as thoroughly and uniformly as possible. One method is to deposit the residue on the soil with a lime or fertilizer spreader, and work it into the soil with conventional tillage equipment. Other methods will readily occur to the operator.

In order to illustrate more fully the nature of this invention and the manner of practicing the same, the following example is presented.

EXAMPLE 1

Linseed meal remaining from the extraction of linseed oil was processed in conventional manner to extract the protein therefrom by extraction with $Na_2S$ solution and washed with water to remove residual $Na_2S$.

The remaining hull fraction was then spread on a plot of ground in poor physical condition with a lime-spreader in strips approximately 10 feet wide, laid out to alternate with check strips fertilizer with inorganic nitrogen in amount equal to the nitrogen in the hulls, of approximately equal width. The whole field was then tilled intensively with a disc-harrow, in a direction parallel to the length of the strips, so as not to disturb the distribution of soil-conditioner. The field was then planted in sweet peppers. Periodic observations were made of the progress of the crop and the physical condition of the soil. During rainy weather, the soil, which was a gravelly loam texture was subject to erosion and appreciable amounts of fine topsoil were carried off in suspension in the surface runoff. Where the soil contained the conditioner, this erosion did not take place. The surface run-off was less because of freer movement of water into the soil, and what did run off carried a minimum of soil with it. The crop was appreciably more productive at maturity in the conditioned areas than in the check strips.

EXAMPLE 2

To illustrate the effectiveness of linseed hulls as a soil-conditioner, the hulls were incorporated in a flask of Nixon (New Jersey) soil, in the amount of 0.007 part by weight of hulls for each part of soil, brought to optimum pH (6.5) and maintained at optimum moisture content (25%) for six weeks at 28° C. At intervals, the percent water-stable aggregates in the soil was measured. The measurement was made by a modified Yoder wet sieve method as follows: The samples were first dry sieved to isolate the fraction passing through a screen having 4.76 mm. openings but retained on a screen with 2.00 mm. openings. A fifty-gram aliquot of these particles was then wet sieved for fifteen minutes through screens with 1.00 and 0.25 mm. openings. The soil particles retained on these screens were dried and weighed. The aggregates were then dispersed and the primary particles were washed clean, dried and weighed. The difference between these two weights divided by the original weight of the soil particles, multiplied by one hundred, was termed the "percent of water-stable aggregates."

For purposes of comparison, whole linseed meal was incorporated into an identical flask of the same soil, and treated in the same way. The amount of linseed meal employed was 0.004 part by weight for each part of soil, to give the same nitrogen content as in the flask containing the hulls (0.02%). The results in terms of percent water-stable aggregates are given in Table I, for the hull and meal treatments compared with the untreated soil.

Table I

| | Percent water-stable aggregates after Incubation Period of— | | | | |
|---|---|---|---|---|---|
| | 1 week | 2 weeks | 3 weeks | 4 weeks | 6 weeks |
| Hulls | 38.1 | 40.9 | 34.8 | 44.2 | 31.7 |
| Meal | 27.5 | 33.1 | 37.4 | 36.9 | 28.6 |
| Control | 20.8 | 17.5 | 25.4 | 26.5 | 25.1 |

The data in Table I indicate that, when applied on the basis of equivalent nitrogen contents, the hulls have an appreciably better effect on soil aggregation than whole linseed meal.

While this invention has been described with reference to certain preferred embodiments and illustrated by means of specific examples, these are illustrative only, and the invention is not to be construed as limited, except as set forth in the appended claim.

I claim:

A method for converting densely-packed, colloidally-dispersable soils to loose, porous coherent aggregates and imparting fertilizer properties to said soil which consists in admixing with said soil linseed hulls.

References Cited in the file of this patent
UNITED STATES PATENTS

| 318,371 | Haas | May 19, 1885 |
| 1,322,817 | Phillip | Nov. 25, 1919 |
| 1,696,709 | Dokkanwadel | Dec. 25, 1928 |
| 1,918,454 | Dean et al. | July 18, 1933 |
| 1,918,900 | Dean et al. | July 18, 1933 |
| 2,017,090 | Eggert | Oct. 15, 1935 |

OTHER REFERENCES

Hanna, "Handbook of Agriculture Chemicals," 1958, publ. by Lester W. Hanna, Forest Groove, Oregon, p. 107.

Quartaroli, "SuAlcune Sostanze di Enorme Attivitá Contenute Nei Semi (Nota 2a)," publ. 1954 in Annali Della Facoltá di Agraria, Universitá di Pisa (Italy), vol. 15, pp. 25–35.

Abstract of same article, with title "Some Highly Active Substances Contained in Seeds, II," publ. 1955 in Chemical Abstracts (magazine), vol. 49, col. 15142.

Sunday Star (newspaper, Washington, D.C.), July 14, 1957, page A–30; advertisement at bottom of cols. 3 and 4, "The New Mul-Tex Buckwheat Hull Mulch."